(12) United States Patent
Ito et al.

(10) Patent No.: US 8,968,567 B2
(45) Date of Patent: Mar. 3, 2015

(54) COLUMN PACKING MATERIAL, COLUMN USING THE SAME, AND METHOD OF SEPARATION USING THE SAME

(75) Inventors: Narushi Ito, Tokyo (JP); Jun Kimura, Tokyo (JP); Masayuki Mizushina, Tokyo (JP); Yohei Inaba, Ibaraki (JP); Kenji Yokoyama, Ibaraki (JP)

(73) Assignees: Tanita Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 1295 days.

(21) Appl. No.: 12/388,047

(22) Filed: Feb. 18, 2009

(65) Prior Publication Data

US 2009/0209753 A1    Aug. 20, 2009

(30) Foreign Application Priority Data

Feb. 19, 2008 (JP) ................. 2008-037966

(51) Int. Cl.
*B01D 15/32* (2006.01)
*B01J 20/28* (2006.01)
*B01J 20/287* (2006.01)
*B01D 15/36* (2006.01)

(52) U.S. Cl.
CPC ......... *B01D 15/362* (2013.01); *B01J 20/28004* (2013.01); *B01D 15/325* (2013.01); *B01J 20/287* (2013.01)
USPC ...... 210/635; 210/656; 210/198.2; 210/502.1

(58) Field of Classification Search
CPC ............... B01D 15/325; B01D 15/362; B01J 20/28004; B01J 20/287
USPC ................. 210/502.1, 635, 656, 659, 198.2
See application file for complete search history.

(56) References Cited

U.S. PATENT DOCUMENTS 3,478,886 A * 11/1969 Hornbeck ............... 210/198.2
3,561,599 A *  2/1971 Sheen ..................... 210/198.3
3,568,840 A *  3/1971 Hashimoto ............. 210/198.2

(Continued)

FOREIGN PATENT DOCUMENTS

JP    2007-121271       5/2007
WO    2006-135339 A1   12/2006

OTHER PUBLICATIONS

European Search Report corresponding to U.S. Appl. No. 12/388,047 mailed on Jun. 12, 2009.

(Continued)

*Primary Examiner* — Ernest G Therkorn
(74) *Attorney, Agent, or Firm* — Rankin, Hill & Clark LLP (57) ABSTRACT

Aimed at readily and exactly separate 8-hydroxy-2'-deoxyguanosine (8-OHdG) contained in a sample, a column packing material used for separating 8-OHdG, which contains a packing material composed of a material having a straight-chain hydrocarbon group having 6 or more and 30 or less carbon atoms as a functional group, and having a carbon content over the surface of carrier of 18% or less by element ratio, wherein the packing material contains 1 cumulative percent or more and 20 cumulative percent or less, on the particle-count basis, of particles having a circle-equivalent diameter, measured using a flow-type particle image analyzer, of 0.5 μm or larger and 10 μm or smaller, is used.

9 Claims, 5 Drawing Sheets

(56) References Cited

U.S. PATENT DOCUMENTS

| | | | |
|---|---|---|---|
| 3,757,490 A * | 9/1973 | Ma | 95/88 |
| 4,160,728 A * | 7/1979 | Kirkland et al. | 210/656 |
| 4,450,082 A * | 5/1984 | Tanouchi et al. | 210/660 |
| 4,789,479 A * | 12/1988 | Onitsuka et al. | 210/635 |
| 4,931,071 A * | 6/1990 | Kaplan et al. | 95/96 |
| 5,154,822 A * | 10/1992 | Simpson et al. | 210/198.2 |
| 5,204,005 A | 4/1993 | Doran, III et al. | |
| 6,846,410 B2 * | 1/2005 | McNeff et al. | 210/198.2 |
| 7,309,426 B2 * | 12/2007 | Barber et al. | 210/198.2 |
| 2005/0236313 A1 * | 10/2005 | Barber et al. | 210/198.2 |
| 2006/0088915 A1 * | 4/2006 | Ohtaki et al. | 435/69.1 |
| 2007/0077662 A1 | 4/2007 | Inaba et al. | |
| 2007/0084774 A1 | 4/2007 | Broske et al. | |
| 2009/0209753 A1 * | 8/2009 | Ito et al. | 536/27.12 |

OTHER PUBLICATIONS

Domagalska, et al. An Investigation of 3micrometer Reverse-Phase Octadecylsilane Packing Materials for High-Performance Liquid Chromatography. 1982. pp. 657-659.

* cited by examiner

Buffer 1 ; 80 mM PHOSPHATE BUFFER (pH 7.0) in 4 mM EDTA
Buffer 2 ; 10 mM PHOSPHATE BUFFER (pH 7.0)

● 8-OHdG   ◆▲★ } SUBSTANCES OTHER THAN 8-OHdG

|  | 50 μm:20 μm | RECOVERY RATIO (%) | CV (%) | PRETREATMENT TIME (hr:min) |
|---|---|---|---|---|
| EXAMPLE 1 | 100:0 | 93.3 | 8.64 | 2:45 |
| EXAMPLE 2 | 95:5 | 96.6 | 1.22 | 2:50 |
| EXAMPLE 3 | 90:10 | 97.5 | 1.16 | 3:00 |
| EXAMPLE 4 | 80:20 | 97.7 | 0.43 | 3:15 |

Fig.5

# COLUMN PACKING MATERIAL, COLUMN USING THE SAME, AND METHOD OF SEPARATION USING THE SAME

This application is based on Japanese patent application No. 2008-037966 the content of which is incorporated hereinto by reference.

BACKGROUND

1. Technical Field

The present invention relates to a column packing material, a column using the same, and a method of separation using the same.

2. Related Art

8-Hydroxy-2'-deoxyguanosine (8-OHdG) has been known as an oxidative stress marker, and has widely been used as a marker indicating oxidative damage of DNA. When 2-deoxyguanosine, which is an intracellular DNA constituent, is exposed to oxidative stress, it reacts with a reactive oxygen species or free radical, and 8-OHdG as a reaction product is then released into body fluid, particularly into urine.

It has been known that elevation of the 8-OHdG level in body fluid is generally ascribable to extrinsic generation of reactive oxygen induced by environmental chemical substances, ultraviolet radiation, ionized radiation and so forth, and intrinsic generation of reactive oxygen ascribable to irregular life causative of cancer or lifestyle-related disease. As specific cases, elevation in 8-OHdG level has been reported in relation to colorectal cancer, lung cancer, childhood cancer, diabetes, chronic hepatitis, coronary artery disease, Alzheimer's disease, atopic dermatitis, smoking, and drinking. On the contrary, lowering in 8-OHdG level has been reported in relation to intake of vitamin E, vitamin C, β-carotin, curcumin, green tea, redwine, tomato source, and Brussels sprouts. Beside these, also investigations aimed at detection of DNA damage, in association with production of reactive oxygen induced by physical exercise, are in progress.

Methods of measuring 8-OHdG is exemplified by a method (HPLC-ECD method) using an electrochemical detector (ECD) coupled with high performance liquid chromatography (HPLC).

On the other hand, a technique of separating and concentrating 8-OHdG in samples, in advance of measurement of 8-OHdG by the HPLC-ECD method, is described in Japanese Laid-Open Patent Publication No. 2007-121271.

Further investigations by the present inventors into a technique of analyzing 8-OHdG in samples such as body fluid using a chromatographic method, however, revealed that some samples after the column chromatography peaks of 8-OHdG in the HPLC-ECD measurement, overlapped with peaks of other components.

It is therefore an object of the present invention to provide a technique capable of more readily and exactly separating 8-OHdG, contained in samples, from contaminants.

SUMMARY

According to the present invention, there is provided a column packing material used for separating 8-hydroxy-2'-deoxyguanosine (8-OHdG), which contains a packing material composed of a material having a straight-chain hydrocarbon group having 6 or more and 30 or less carbon atoms as a functional group, and having a carbon content over the surface of carrier of 18% or less by element ratio, wherein the packing material contains 1 cumulative percent or more and 20 cumulative percent or less, on the particle-count basis, of particles having a circle-equivalent diameter, measured using a flow-type particle image analyzer, of 0.5 μm or larger and 10 μm or smaller.

According to the present invention, there is provided also a column packing material described in the above, which further contains 65 cumulative percent or more and 99 cumulative percent or less, on the particle-count basis, of particles having a circle-equivalent diameter, measured using a flow-type particle image analyzer, of 20 μm or larger and 100 μm or smaller, or further contains 78 cumulative percent or more and 99 cumulative percent or less, on the particle-count basis, of particles having a circle-equivalent diameter, measured using a flow-type particle image analyzer, of 20 μm or larger and 100 μm or smaller.

According to the present invention, there is provided still also a column containing the column packing material of the above-described invention.

In the present invention, a packing material having a straight-chain hydrocarbon group having 6 or more and 30 or less carbon atoms as a functional group, and having a ratio of carbon (C) contained over the surface of carrier, that is, over the surface of this packing material relative to the total of elements contained over the entire surface of 18% or less by element ratio, is used. The packing material is configured to contain particles having a circle-equivalent diameter, measured using a flow-type particle image analyzer, of 0.5 μm or larger and 10 μm or smaller at a specific ratio. Alternatively, it is configured to contain particles having a circle-equivalent diameter, measured using the flow-type particle image analyzer, of 0.5 μm or larger and 10 μm or smaller, and particles having a circle-equivalent diameter of 20 μm or larger and 100 μm or smaller, at a specific ratio. In this way, 8-OHdG and contaminants contained in a sample may readily and exactly be separated from each other, and an analytical peak of 8-OHdG may be suppressed from being overlapped with analytical peaks of contaminants in the vicinity thereof.

By adjusting the ratio of particles having a circle-equivalent diameter of 20 μm or larger and 100 μm or smaller to 65 cumulative percent or more and 99 cumulative percent or less, on the particle-count basis, 8-OHdG in samples may exactly be adsorbed to the packing material, and may effectively be separated.

In addition, by adjusting the ratio of particles having a circle-equivalent diameter of 0.5 μm or larger and 10 μm or smaller to 1 cumulative percent or more and 20 cumulative percent or less on the particle-count basis, the specific surface area of the column packing material may appropriately be increased, and thereby 8-OHdG and the contaminants may efficiently be separated.

In the column packing material of the present invention, the packing material may also contain particles having a circle-equivalent diameter, measured using a flow-type particle image analyzer, of 35 μm or larger and 60 μm or smaller, and particles having a circle-equivalent diameter of 10 μm or larger and 35 μm or smaller, at a ratio by weight of 80:20 to 95:5. In this way, the recovery ratio of 8-OHdG may further be improved.

Methods of measuring thus-separated 8-OHdG are not specifically limited, wherein an electrochemical reaction may be adoptable.

Also any arbitrary combinations of these configurations, and also any exchanges of expressions in the present invention among method, device and so forth, may be effective as embodiments of the present invention.

According to the present invention, there is provided, for example, still also a method of separating 8-OHdG using the above-described column packing material, which includes:

allowing a liquid sample to contact with the packing material so as to make the packing material adsorb the 8-OHdG; and allowing, in succession, an eluent to contact with the packing material so as to elute, and thereby to recover, the 8-OHdG adsorbed by the packing material.

As has been described in the above, according to the present invention, 8-OHdG contained in samples may readily and exactly be separated.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION

The invention will now be described herein with reference to illustrative embodiments. Those skilled in the art will recognize that many alternative embodiments can be accomplished using the teachings of the present invention and that the invention is not limited to the embodiment illustrated for explanatory purposes.

Embodiments of the present invention will be described below, referring to the attached drawings. Note that any common constituents will be given with the same reference numerals in all drawings, so that explanations therefor will not be repeated.

(First Embodiment)

In this embodiment, a column packing material will be explained.

The column packing material in this embodiment is used for separating 8-OHdG. The column packing material contains a packing material composed of a material having a straight-chain hydrocarbon group having 6 or more and 30 or less carbon atoms as a functional group, and having a carbon content over the surface of carrier of 18% or less by element ratio. Because the packing material is composed of a packing material having a straight-chain hydrocarbon group having 6 or more and 30 or less carbon atoms as a functional group, and having a ratio of carbon (C) contained over the surface of carrier (also referred to as "C %", hereinafter) of 18% or less by element ratio, the packing material may function as a hydrophobic adsorbent capable of adsorbing and capturing 8-OHdG.

In this embodiment, from the viewpoint of providing more desirable retention performance of 8-OHdG to the packing material, the number of carbon atoms of the hydrocarbon group is adjusted to 6 or more and 30 or less, preferably 8 or more and 22 or less, and more preferably 10 or more and 20 or less.

The packing material is typically a reversed-phase packing material, and a material composing thereof may be exemplified more specifically by silica gel chemically bound with octadecyl (ODS) group. In this case, a mode of bonding of silylation agent in the silica gel chemically bound with octadecyl (ODS) group, may preferably be a mode by which the silylation agent is bound to silanol group in the silica gel at an 1:1 ratio, that is, a monomeric mode of bonding. By this configuration, the reversed-phase packing material may be prevented from becoming excessively hydrophobic.

In view of providing the packing material as a reversed-phase packing material further improved in the hydrophobicity, the carbon content may be adjusted to 18% or less, and preferably 15% or less.

The packing material in this embodiment contains 1 cumulative percent or more and 20 cumulative percent or less, on the particle-count basis, of particles having a circle-equivalent diameter, measured using a flow-type particle image analyzer, of 0.5 μm or larger and 10 μm or smaller. In addition, the packing material may further contain 65 cumulative percent or more and 99 cumulative percent or less, or 78 cumulative percent or more and 99 cumulative percent or less, on the particle-count basis, of particles having a circle-equivalent diameter, measured using the above-described analyzer, of 20 μm or larger and 100 μm or smaller. By mixing the particles having a circle-equivalent diameter of 0.5 μm or larger and 10 μm or smaller at a specific ratio, or by mixing particles having a circle-equivalent diameter of 0.5 μm or larger and 10 μm or smaller, with particles having a circle-equivalent diameter of 20 μm or larger and 100 μm or smaller at a specific ratio, 8-OHdG and contaminants, which are causative of analytical peaks close to an analytical peak of 8-OHdG, that is, which are only slightly differed in the molecular weights or in the properties from those of 8-OHdG, may readily and exactly be separated from each other, even if the both are contained in samples. Accordingly, accuracy of the measurement of 8-OHdG may be improved. This is supposedly because, by mixing the particles having different particle sizes at a specific ratio, the smaller particles may enter gaps between the larger particles, the surface area of the packing material per unit area may be maximized, and thereby the adsorption efficiency of 8-OHdG may be improved.

In view of efficiently separating 8-OHdG, the ratio of the particles having a circle-equivalent diameter of 20 μm or larger and 100 μm or smaller may be adjusted to 65 cumulative percent or more. On the other hand, in view of exactly separating 8-OHdG, the ratio of the particle having a circle-equivalent diameter of 20 μm or larger and 100 μm or smaller may be adjusted to 99 cumulative percent or less.

In view of exactly separating 8-OHdG by increasing the specific surface area of the packing material, the ratio of the particles having a circle-equivalent diameter of 0.5 μm or larger and 10 μm or smaller may be adjusted to 1 cumulative percent or more. On the other hand, in view of speeding up the separation so as to raise efficiency of separation, the ratio of the particles having a circle-equivalent diameter of 0.5 μm or larger and 10 μm or smaller may be adjusted to 20 cumulative percent or less.

In view of further efficiently separating 8-OHdG, the ratio of the particles having a circle-equivalent diameter, measured using a flow-type particle image analyzer, of 0.5 μm or larger and 10 μm or smaller may be adjusted preferably to 4 cumulative percent or more and 19 cumulative percent or less, more preferably to 4 cumulative percent or more and 13 cumulative percent or less, and particularly preferably to 6 cumulative percent or more and 13 cumulative percent or less, on the particle-count basis. On the other hand, the ratio of the particles having a circle-equivalent diameter, measured using the above-described analyzer, of 20 μm or larger and 100 μm or smaller may be adjusted preferably to 68 cumulative percent or more and 95 cumulative percent or less, more preferably to 78 cumulative percent or more and 93 cumulative percent or less, and still more preferably to 85 cumulative percent or more and 91 cumulative percent or less, on the particle-count basis.

The flow-type particle image analyzer is an instrument irradiating a flow cell, designed to allow a sample containing particles to be measured to flow therethrough, with light such as strobe light, capturing an image of the particles flowing therethrough, and calculating parameters indicating geometry of the particles, such as circle-equivalent diameter, by image analysis. Because some of the actual particles may be deformed typically into ellipsoid, the circle-equivalent diameter herein is defined as the diameter of a sphere assumed to have a projected area same as the projected area of the actually-measured particles. The flow-type particle image analyzer may specifically be exemplified by FPIA-3000 from Sysmex Corporation.

The particles having a circle-equivalent diameter, measured using a flow-type particle image analyzer, of 35 μm or larger and 60 μm or smaller, and the particles having a circle-equivalent diameter of 10 μm or larger and 35 μm or smaller, may be contained at a ratio by weight of 80:20 to 95:5. By this configuration, the recovery ratio of 8-OHdG may further be improved. The ratio by weight of the particles having a circle-equivalent diameter of 40 μm or larger and 60 μm or smaller, and the particles having a circle-equivalent diameter of 10 μm or larger and 30 μm or smaller may preferably adjusted to 90:10, in view of improving the balance between the recovery ratio and hours necessary for separation of 8-OHdG.

(Second Embodiment)

In this embodiment, a column containing the column packing material described in the first embodiment will be explained.

The column of this embodiment may be obtained by packing the column packing material described in the first embodiment, by a predetermined method. For example, the particles having a particle size of 20 μm and the particles having a particle size of 50 μm may be mixed typically at a ratio by weight of 90:10, and may be packed.

In the process of packing, it may be also preferable to confirm uniform mixing of the packing material, by evaluating the particle size distribution using a flow-type particle image analyzer. In this way, variation in the state of mixing may be suppressed even when the particles having different particle sizes are packed into the column. Therefore, the column packed with the particles having different particle sizes at a constant ratio of mixing, may be obtained in a stable manner. Thus-obtained column may preferably be used as a column for separating 8-OHdG. The column may be applicable also as a pretreatment column used for quantifying 8-OHdG.

A method of separating 8-OHdG using the column of this embodiment will be explained below.

The method of separation includes a step of introducing a liquid sample into the column, so as to make the packing material adsorb 8-OHdG; and a step of allowing, in succession, introducing an eluent into the column, so as to elute, and thereby to recover, the 8-OHdG adsorbed by the packing material. The method is specifically proceeded according to procedures in step 11 and step 12 below.

Further in this embodiment, 8-OHdG in the sample is separated and concentrated by a method combined with chromatography. The method of separation is such as sequentially carrying out reversed-phase chromatography (steps 11 to 12 below) and cation exchange chromatography (steps 13 to 14 below), and contains the steps below:

step 11: introducing a liquid sample into a column (first column) containing the column packing material of the first embodiment, and allowing it to contact with the column packing material;

step 12: allowing a predetermined liquid to flow through the first column so as to elute the substance adsorbed to the column packing material, to obtain an eluate containing 8-OHdG;

step 13: introducing the eluate obtained in step 12 into a cation exchange column (second column); and step 14: allowing a predetermined liquid to flow through the second column so as to elute the substance adsorbed to the cation exchange resin, to obtain an eluate containing 8-OHdG.

Specific examples of the liquid sample used in step 11 may include body fluid such as urine, blood and saliva. Paragraphs below will explain the case where the sample is urine. In view of carrying out the measurement more exactly, the amount of urine to be collected may typically be 0.5 mL or more and 50 mL or less, preferably 1.0 mL or more and 10 mL or less, and more preferably 1.5 mL or more and 5.0 mL or less. Crude urine as collected may be adoptable. Alternatively, as explained later in Examples (FIG. 1), urine may be diluted by a predetermined buffer or water. The urine may preferably be concentrated immediately after collection, while allowing concentration several hours or several days after the collection.

In step 11, as a combination of a material composing the packing material and the mobile phase of the first column, a combination of silica gel chemically bound with octadecyl (ODS) group and a water-acetonitrile mixed solvent may typically be used. The reversed-phase chromatography is characterized by a system in which the stationary phase is low in polarity than the mobile phase. In such system, the solutes are captured by the stationary phase through hydrophobic bonding, wherein solutes having larger hydrophobicity are eluted in a more delayed manner. In this embodiment, a preliminarily conditioned packing material and body fluid sample (urine) are brought into contact. The packing material is thoroughly conditioned using water and alcohol.

A predetermined buffer or the like, as a washing liquid, is then passed through the first column, so as to wash off any non-captured substances. The non-captured substance may be exemplified by contaminants not captured by the packing material in the first column, or contaminants masking measurement of 8-OHdG. The washing liquid preferably has a pH value of typically 5.5 or above and 8.5 or below, more preferably 6 or above and 8 or below, and still more preferably 6.5 or above and 7.5 or below. The washing liquid is a buffer having a pH value adjusted within the above described ranges (phosphate buffer, for example), and contains typically 0% (W/V) or more and 5% or less, preferably 1% or more and 4% or less, and more preferably 1% or more and 3% or less of solvent. Specific examples of the solvent include ethanol, acetonitrile and methanol. The volume of washing liquid may appropriately be determined depending on the column size and the concentration of sample, wherein in view of more exactly removing the non-captured substances, the volume may typically be set to 1 mL or more and 100 mL or less, preferably 1 mL or more and 50 mL or less, and more preferably 1 mL or more and 20 mL or less.

After the washing, in step 12, a predetermined buffer or the like is allowed to pass through the first column, so as to elute the adsorbed substances on the packing material into the eluate. In this way, a liquid containing 8-OHdG as a target substance eluted therein may be obtained. The eluent is typically a buffer described in the above as an example of the washing liquid, and contains 5% (W/V) or more of ethanol, acetonitrile, methanol or the like. The concentration of the eluent (buffer) may typically be set to 5% (W/V) or more and 20% or less, and preferably 6% or more and 10% or less. The eluent of as much as 2.5 mL or more and 10 mL or less is allowed to pass through the first column, and an 1-mL fraction between a total eluate volume of 1.5 mL to 2.5 mL is collected. The volume of eluent and the volume of collected eluate may experimentally be determined, and may appropriately be increased or decreased, depending on the column size, sample volume and so forth.

In step 13, the collected sample containing 8-OHdG is introduced into the cation exchange column (second column). The second column is preferably configured as a strongly acidic cation exchanger. The contaminants in the sample are allowed to adsorb onto the cation exchanger in the second column, thereby the target 8-OHdG is recovered. Any publicly-known ion exchangers may be adoptable as the cation exchanger, without special limitation. Preferable cation exchanger may be exemplified by a strongly acidic cation exchanger, and more specifically by an exchanger introduced with sulfonate group. The sulfonate group may specifically be exemplified by benzene sulfonate group.

Methods of bringing the sample and the cation exchanger into contact are not specifically limited, wherein either of the batch process and column process may be adoptable. In view of efficiently concentrating 8-OHdG even from a small amount of samples, the column process may be preferable. The sample containing 8-OHdG eluted out from the first column (as much as 1 mL, for example) is brought into contact with the cation exchanger in the second column. The cation exchanger is preliminarily conditioned, and is brought into equilibrium by treatment with sufficient amounts of water and ethanol, and a predetermined buffer. The buffer may be exemplified by a phosphate buffer typically adjusted to pH5.5 or above and 8.5 or below, preferably 6.0 or above and 8.0 or below, and more preferably 6.5 or above and 7.5 or below. The buffer contains a solvent typically to as much as 6% (W/V) or more, preferably 7% or more, and more preferably 8%. The solvent may be exemplified by alcohols such as ethanol, methanol and so forth, and acetonitrile. The concentration of the solvent (ethanol, for example) may be adjusted to equal to, or higher than the concentration of ethanol and so forth contained in the eluent from the first column. More specifically, the concentration is typically adjusted to 5% or more and 40% or less, preferably 6% or more and 30% or less, and more preferably and generally 7% or more and 30% or less.

In the column process, the sample is passed through the preliminarily-conditioned cation exchanger in step 13, and developed using a developing solution in step 14. The developing solution used herein may be same as, or nearly same as, the solution used for the conditioning. The amount of consumption of the developing solution may typically be 1 mL or more and 10 mL or less, wherein approximately 1.5-mL fraction eluted between a total eluate volume of 0.5 mL and 2.0 mL is collected. The volume of development solution and collected eluate may experimentally be determined, and may appropriately be increased or decreased, depending on the column size, sample volume and so forth.

The collected eluate contains 8-OHdG in a concentrated manner, and may be subjected to quantification of 8-OHdG. The solvent in the collected eluate may appropriately be removed before the quantification of 8-OHdG.

The procedures exemplified herein were such as allowing the sample to pass, and then allowing the developing solution to pass in step 14 to thereby collect 8-OHdG, whereas as described later in Examples, 8-OHdG may be collectable by allowing the sample to pass, followed by washing and elution, also with respect to the second column.

Next, a method of quantification of 8-OHdG will be explained. The method of quantification may specifically be exemplified by measurement using HPLC, wherein 8-OHdG is detectable making use of an electrochemical reaction. More specifically, electric current ascribable to oxidation and reduction of 8-OHdG is detected making use of an electrochemical reaction, and the concentration of 8-OHdG is calculated. The detection device is not specifically limited, wherein a current-detection-type chemical sensor may be adoptable. The working electrode of the sensor may be configured, for example, by an electro-conductive electrode using platinum, carbon or the like, and the reference electrode may be configured by a silver/silver chloride electrode or the like. When a predetermined potential is applied between the working electrode and the reference electrode, an electric current corresponded to the amount of 8-OHdG generates. The measurement herein may preferably be carried out based on dual-electrode measurement between the working electrode and the counter electrode, whereas in view of carrying out more exact measurement, three-electrode measurement among the working electrode, counter electrode and reference electrode may particularly be preferable.

According to the above-described procedures, 8-OHdG in samples may be separated, concentrated, and quantified. Since, in this embodiment, the column containing the packing material described in the first embodiment is used as the first column, the analytical peak of 8-OHdG may be confirmed in the HPLC fraction as a single peak, while avoiding overlapping of the analytical peak ascribable to contaminants.

Alternative to the measurement of urinary 8-OHdG described in the above, 8-OHdG in serum may be quantified after concentration carried out between step 14 and quantification, since the normal level of 8-OHdG in serum is only $\frac{1}{100}$ of that in urine. For example, by adding a 100-fold concentration process such as setting a serum sample on a heat block at 50° C., and vaporizing the solvent under a nitrogen gas flow, an analytical peak of 8-OHdG in serum may clearly be observed in the measurement.

The embodiment of the present invention have been described in the above referring to the attached drawings, merely as examples of the present invention, while allowing adoption of various configurations other than those described in the above.

For example, it is not always necessary to use the column packing material while being packed in a column as descried in the foregoing embodiments, instead allowing use in the separation based on the batch process. The method of separation using the packing material in the above-described embodiment includes a step of allowing a liquid sample to contact with the packing material, so as to make the packing material adsorb 8-OHdG; and allowing, in succession, an eluent to contact with the packing material so as to elute, and thereby to recover, 8-OHdG adsorbed by the packing material.

The packing material in the above-described embodiments may be adoptable also to a C-18 column containing two or more species of column carriers differed in the property (ODS and silica gel, for example), or to a solid-state extraction column making use of a strong cation column, for example.

EXAMPLES

Figure 1:
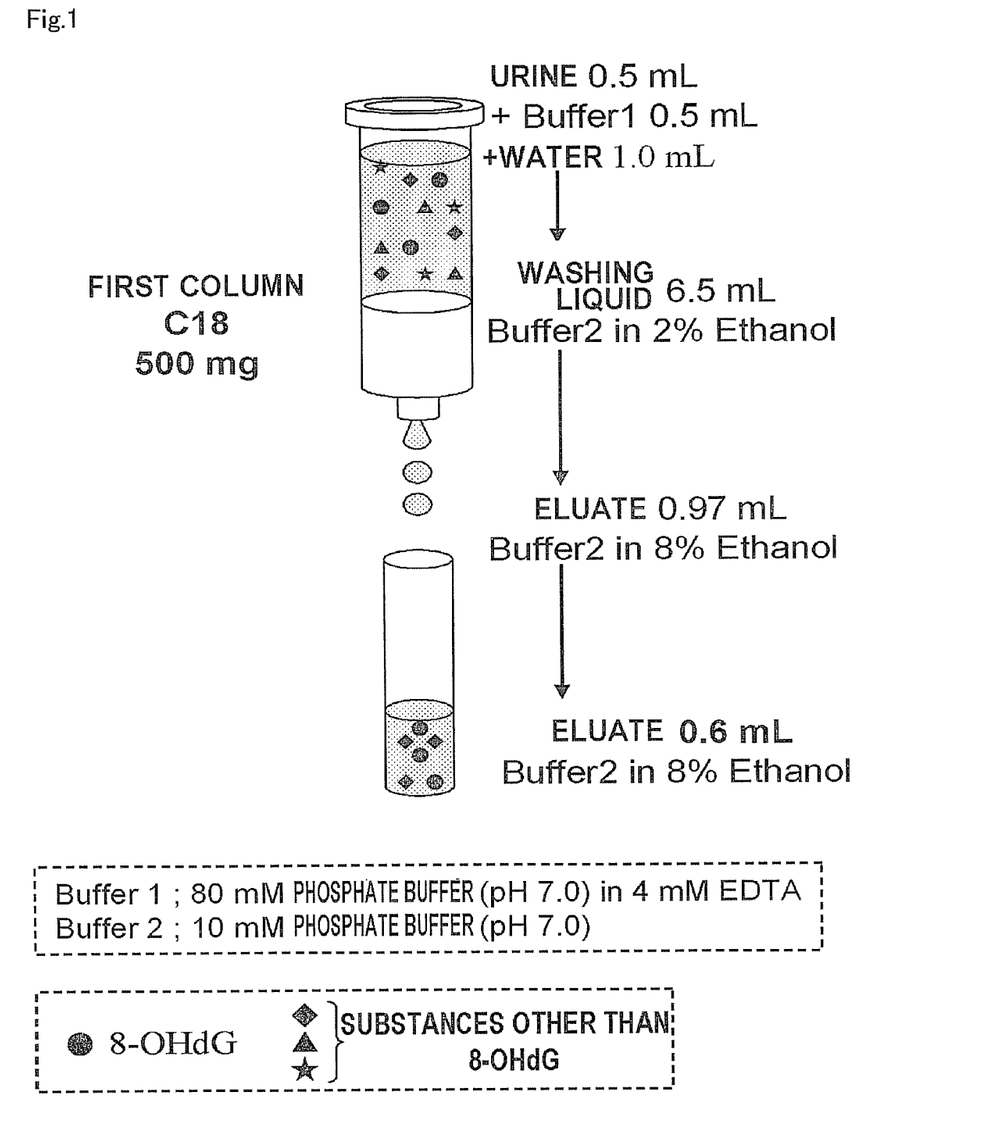
FIG. 1 is a drawing explaining procedures of separating 8-OHdG in Examples.
Figure 2:
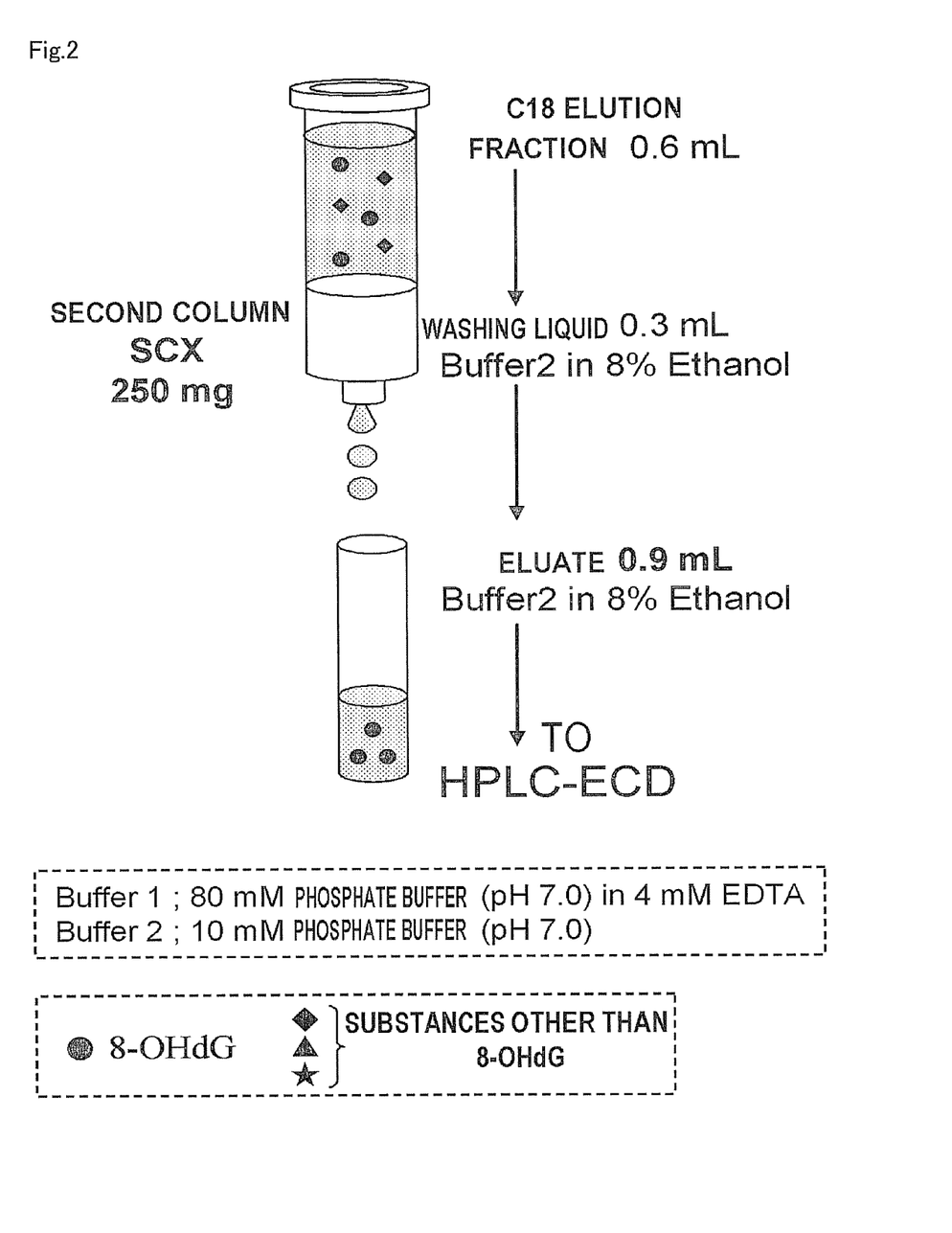
FIG. 2 is a drawing explaining additional procedures of separating 8-OHdG in the Examples.

In Examples below, urinary 8-OHdG was separated according to the method described in the second embodiment. In this study, the packing materials having different ratios of mixing of the particles having a circle-equivalent diameter, measured using a flow-type particle image analyzer, of 35 μm or larger and 60 μm or smaller, and the particles having a circle-equivalent diameter, measured using a flow-type particle image analyzer, of 10 μm or larger and 35 μm or smaller, were prepared, and influences on the separation was evaluated. FIG. 1 and FIG. 2 are drawings explaining procedures of separating 8-OHdG. In the procedures illustrated in FIG. 1 and FIG. 2, buffers listed below were adopted.

Buffer 1: 80 mM phosphate buffer (pH7.0, 4 mM EDTA)
Buffer 2: 10 mM phosphate buffer (pH7.0)

(First Column)

Four types of packing materials (Example 1 to Example 4) listed below, having different ratios of mixing of the particles having a particle size of 50 μm and the particles having a particle size of 20 μm, were prepared as the packing material for the first column. As the particles having a particle size of 50 μm and having a particle size of 20 μm, a 50-μm-size product and a 20-μm-size product of ODS-AQ from YMC Co., Ltd. were respectively used. These packing materials were homogenously mixed according to ratios by weight specified in Example 1 to Example 4, and thereby packing materials of Example 1 to Example 4 were obtained.

Example 1 50-μm:20-μm=100:0
Example 2 50-μm:20-μm=95:5
Example 3 50-μm:20-μm=90:10
Example 4 50-μm:20-μm=80:20

The method of measuring the particle size of the packing material of the first column is as follows. The particle size of material such as the packing material of this column is measured generally by the sedimentation method or Coulter method. The sedimentation method is a method of determining particle size, by suspending particles in a solvent having a predetermined viscosity, allowing the particles to cause sedimentation separation by particle sizes within a cell, making use of a large acceleration caused by gravitational acceleration or centrifugal force, scanning the entire cell using an optical detection system, and analyzing a time-dependent changes in sedimentation pattern based on a position-based distribution pattern of particle concentration distribution. On the other hand, the Coulter method is based on a principle of electric resistance, by which changes in electric resistance between two electrodes in the process of passage of particles through an aperture are measured. The electric resistance observed herein is exactly proportional to the mass of passed particles. The volume of sample suspension flowing through the aperture is precisely controlled, so that the particle size and concentration may be measured using an exact mass of particles. On the practical basis, the methods suitable for the individual particle sizes are selected. In the Examples, the sedimentation method is selected for a particle size of 50 μm, and the Coulter method is selected for a particle size of 20 μm.

Figure 3:
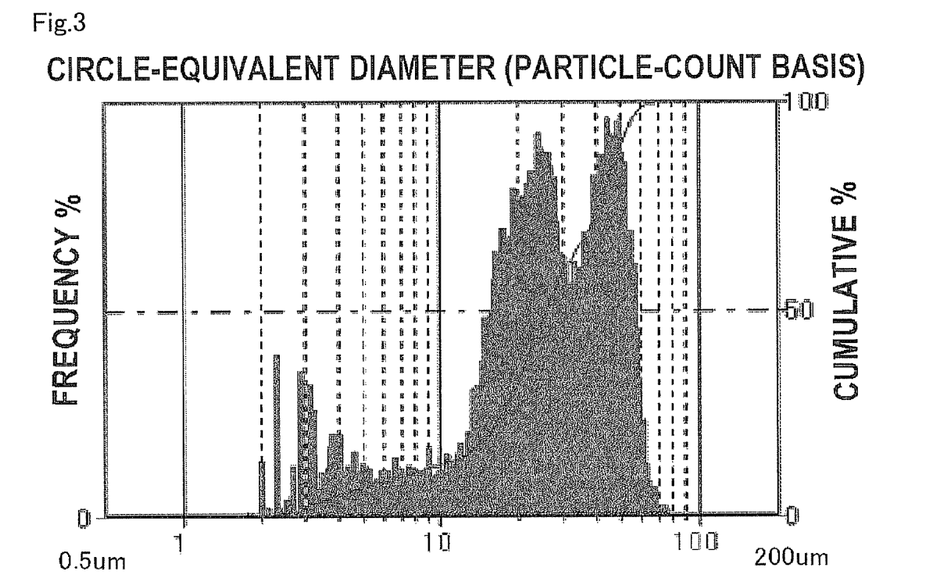
FIG. 3 is a drawing showing a result of measurement, using a flow-type particle image analyzer, of a packing material used for separating 8-OHdG in one Example.

All of the packing materials of Examples 1 to 4 were found to contain 1 cumulative percent or more and 20 cumulative percent or less, on the particle-count basis, of particles having a circle-equivalent diameter, measured using a flow-type particle image analyzer, of 0.5 μm or larger and 10 μm or smaller, and to contain 65 cumulative percent or more and 99 cumulative percent or less, on the particle-count basis, of particles having a circle-equivalent diameter, measured using the same analyzer, of 20 μm or larger and 100 μm or smaller. As an exemplary result of flow-type particle image analysis, a result of measurement of the packing material of Example 3 is shown in FIG. 3. FIG. 3 shows a relation between circle-equivalent diameter and cumulative percentage of the results of flow-type particle image analysis of the packing material of Example 3. Also results of Examples 1 to 4 are shown in Table 1 below.

TABLE 1

| | Particles having a circle-equivalent diameter of 0.5 μm or larger and 10 μm or smaller, as measured using a flow-type particle image analyzer (cumulative percent) | Particles having a circle-equivalent diameter of 20 μm or larger and 100 μm or smaller, as measured using a flow-type particle image analyzer (cumulative percent) |
|---|---|---|
| Example 1 | 19 | 65 |
| Example 2 | 4 | 91 |
| Example 3 | 13 | 68 |
| Example 4 | 6 | 85 |

Columns respectively packed with 800 mg of the packing materials of Examples 1 to 4 were prepared.

(Separation of Urine Using Reversed-Phase Column (First Column))

FIG. 1 is a drawing illustrating separation procedures of urine using the first column. The individual first columns of Examples 1 to 4 were activated by allowing ethanol and water to pass therethrough in this order. To each of these columns, a 2-mL sample containing 0.5 mL or urine, 0.5 mL of Buffer 1 and 1 mL of pure water was loaded. Then, as a washing liquid, 6.5 mL of Buffer 2 containing 2% ethanol was passed therethrough.

Then, as an eluent, Buffer 2 containing 8% ethanol was passed, initial 0.97 mL of eluate was discarded, and a succeeding 0.6 mL fraction, which is a fraction between a total eluate volume of 0.97 mL and 1.57 mL, was collected as an 8-OHdG-containing fraction. The obtained fraction was subjected to a cation exchange column described later.

(Recovery of 8-OHdG Using Cation Exchange Column (Second Column))

FIG. 2 is a drawing illustrating separation procedures using the second column. As the second column, a column packed with 250 mg of cation exchanger (SCX, from Varian, Inc.) was prepared, and was then activated by allowing ethanol, water, and Buffer 2 containing 8% ethanol to pass therethrough.

The 8-OHdG-containing fraction (0.6 mL) obtained as described in the above was applied to the second column. Thereafter, 0.3 mL of Buffer 2 containing 8% ethanol was passed therethrough to wash the column. Then, 0.9 mL of Buffer 2 containing 8% ethanol was passed, and the entire volume was collected as an 8-OHdG fraction.

(Measurement of 8-OHdG)

The 8-OHdG fraction collected as described in the above was injected into an HPLC system to quantify 8-OHdG. The HPLC system used herein was an HPLC system from Tosoh Corporation equipped with a degassing device (SD-8022), a pump (CCPM-II) adapted to gradient elution, an auto-sampler (AS-8020), a column oven (CO-8020), a UV detector (UV-8020), and an electrochemical detector (EC-8020) (ECD). A reversed-phase column, Hydrosphere C18 (4.6× 150 mm, 5 μm, from YMC Co., Ltd.) was used as a separation column. The mobile phases adopted herein were a 10-mM phosphate buffer (pH 7.0, 1 mM EDTA, containing acetonitrile at a final concentration of 2%), and a similar phosphate buffer containing 8% acetonitrile. The analysis was carried out based on a linear gradient using two these buffers. The gradient pas programmed so as to adjust the 8% acetonitrile buffer to 0% for a duration from 0 to 5 minutes, 100% from 5 to 20 minutes, 100% from 20 to 25 minutes, and 0% from 25 to 30 minutes. The measurement was carried out under conditions including a flow rate of 1 mL/min, a detection wavelength of UV detector of 254 nm, an applied voltage of ECD of +500 mV, and a column oven temperature of 35° C. The duration of a single cycle of measurement was 50 minutes including duration for washing.

Figure 4:
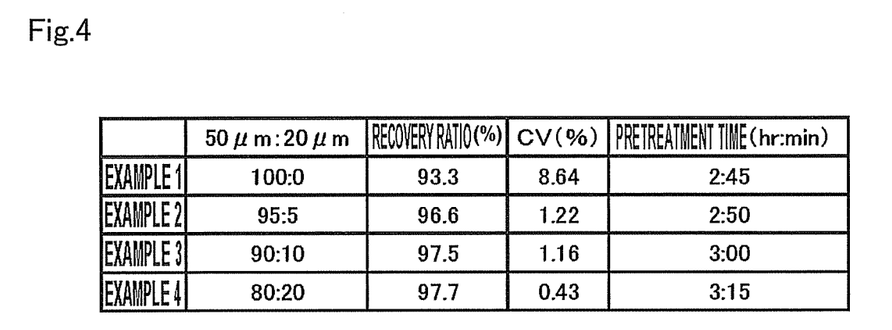
FIG. 4 is a drawing showing results of measurement of 8-OHdG in Examples.

Results of measurements of 8-OHdG respectively obtained from the reversed-phase columns using the packing materials of Examples 1 to 4 are shown in FIG. 4. Note that "pretreatment time" in FIG. 4 means the total time required for treatment of using the first and second columns.

Figure 5:
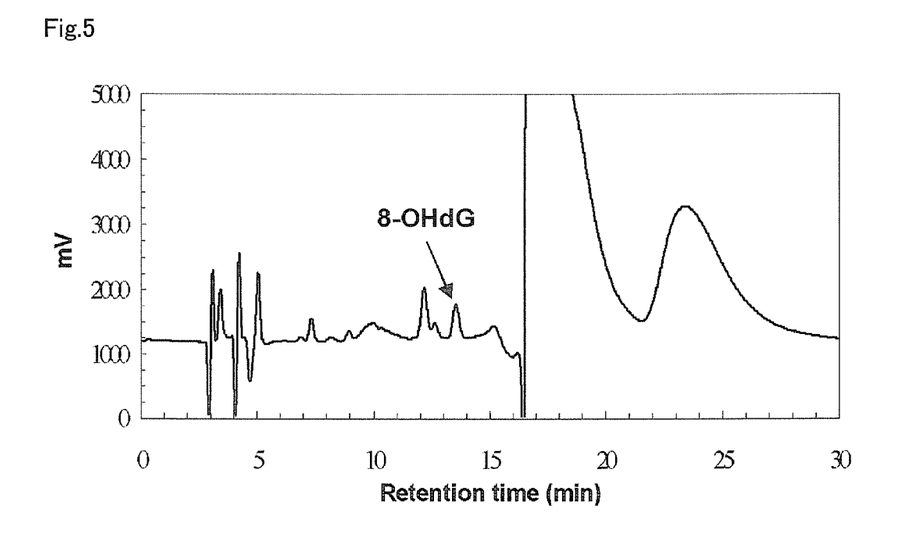
FIG. 5 is a drawing showing a result of measurement of 8-OHdG in one Example.

A result of HPLC-ECD measurement, adopting the packing material of Example 3 for the reversed-phase column, is shown in FIG. 5.

It was found from FIG. 4 that, by virtue of the packing materials of Examples 1 to 4, containing particles having circle-equivalent diameters, measured using a flow-type particle image analyzer, of 0.5 μm or larger and 10 μm or smaller, and 20 μm or larger and 100 μm or smaller at a predetermined ratio, 8-OHdG was successfully separated at a high recovery ratio. Moreover, by mixing particles having particle sizes of 20 μm and 50 μm at specific ratios as shown by Examples 2 to 4, the CV (coefficient of variation) was further successfully lowered.

From FIG. 5, it was also found that, when the packing material of Example 3, containing the particle having a circle-equivalent diameter of 0.5 μm or larger and 10 μm or smaller, and the particle having a circle-equivalent diameter of 20 μm or larger and 100 μm or smaller at a specific ratio, was used, a single peak of 8-OHdG was observed without being associated with peaks ascribable to contaminants.

It is apparent that the present invention is not limited to the above embodiment, that may be modified and changed without departing from the scope and spirit of the invention.

What is claimed is:

1. A column packing material used for separating 8-hydroxy-2'-deoxyguanosine (8-OHdG),
    containing a packing material composed of a material having a straight-chain hydrocarbon group having 6 or more and 30 or less carbon atoms as a functional group, and having a carbon content over the surface of carrier of 18% or less by element ratio,
    wherein said packing material contains 4 cumulative percent or more and 13 cumulative percent or less, on the particle-count basis, of particles having a circle-equivalent diameter, measured using a flow-type particle image analyzer, of 0.5 μm or larger and 10 μm or smaller, and said column packing material contains 65 cumulative percent or more and 99 cumulative percent or less, on the particle-count basis, of particles having a circle-equivalent diameter, measured using a flow-type particle image analyzer, of 20 μm or larger and 100 μm or smaller.

2. The column packing material used for separating 8-hydroxy-2'-deoxyguanosine (8-OHdG) as claimed in claim 1, wherein said column packing material contains 78 cumulative percent or more and 99 cumulative percent or less, on the particle-count basis, of particles having a circle-equivalent diameter, measured using a flow-type particle image analyzer, of 20 μm or larger and 100 μm or smaller.

3. The column packing material as claimed in claim 1, wherein said material composing said packing material is a silica gel having octadecyl group.

4. The column packing material as claimed in claim 2, wherein said material composing said packing material is a silica gel having octadecyl group.

5. The column packing material used for separating 8-hydroxy-2'-deoxyguanosine (8-OHdG) as claimed in claim 1, wherein said column packing material contains 68 cumulative percent or more and 95 cumulative percent or less, on the particle-count basis, of particles having a circle-equivalent diameter, measured using a flow-type particle image analyzer, of 20 μm or larger and 100 μm or smaller.

6. The column packing material used for separating 8-hydroxy-2'-deoxyguanosine (8-OHdG) as claimed in claim 1, wherein said column packing material contains 78 cumulative percent or more and 93 cumulative percent or less, on the particle-count basis, of particles having a circle-equivalent diameter, measured using a flow-type particle image analyzer, of 20 μm or larger and 100 μm or smaller.

7. The column packing material used for separating 8-hydroxy-2'-deoxyguanosine (8-OHdG) as claimed in claim 1, wherein said column packing material contains 85 cumulative percent or more and 91 cumulative percent or less, on the particle-count basis, of particles having a circle-equivalent diameter, measured using a flow-type particle image analyzer, of 20 μm or larger and 100 μm or smaller.

8. A column containing the column packing material as claimed in claim 1.

9. A method of separating 8-OHdG using the column packing material as claimed in claim 1, comprising:
    allowing a liquid sample to contact with said packing material so as to make said packing material adsorb said 8-OHdG; and
    allowing, in succession, an eluent to contact with said packing material so as to elute, and thereby to recover, said 8-OHdG adsorbed by said packing material.

* * * * *